June 24, 1930.                    W. N. BOOTH                    1,766,100
                                   WIRE WHEEL
                              Filed June 25, 1928            2 Sheets-Sheet 1
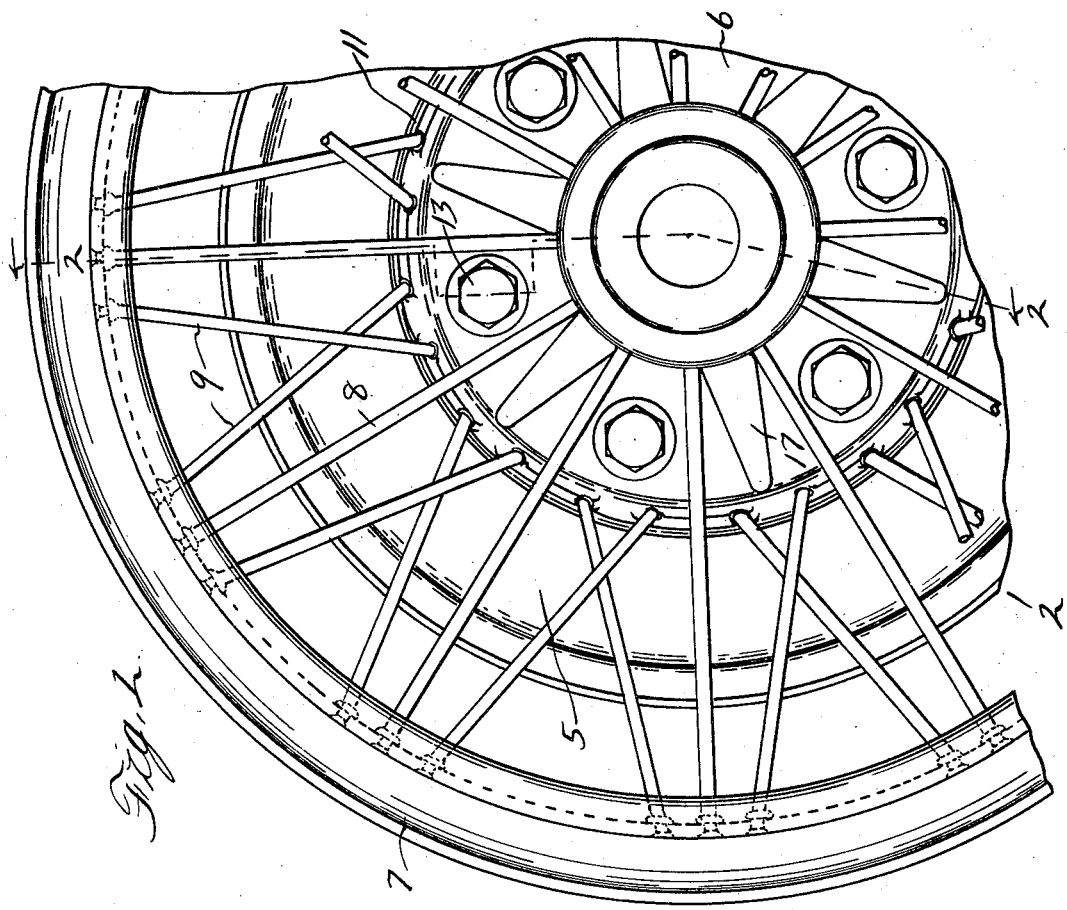
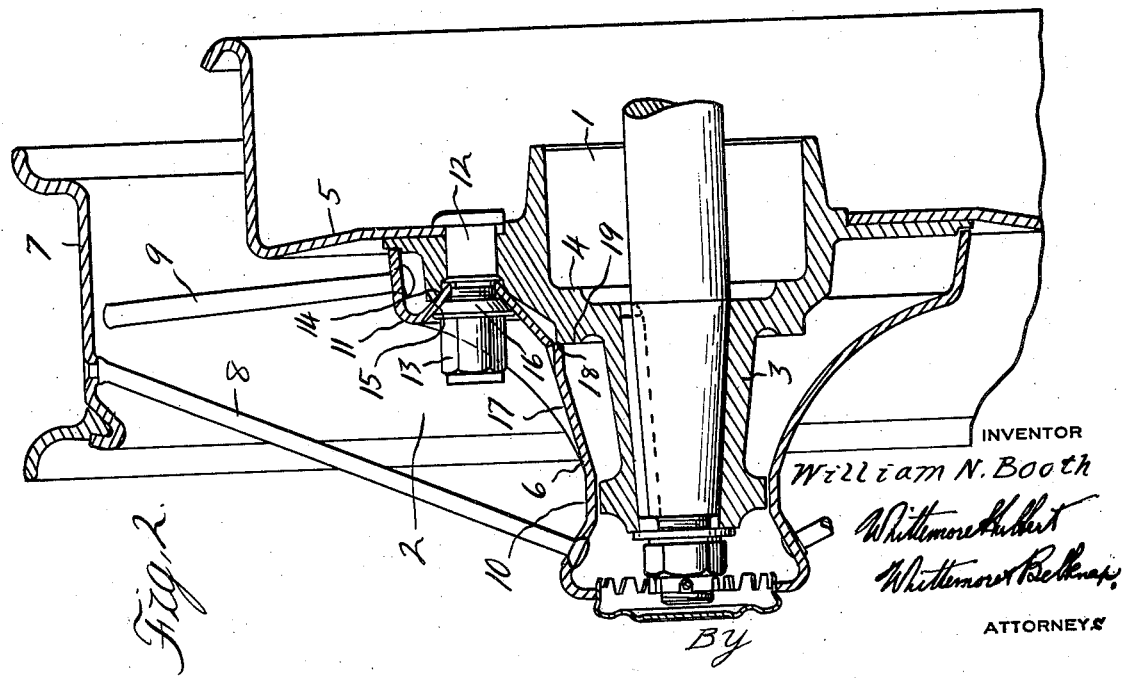
INVENTOR
William N. Booth
ATTORNEYS June 24, 1930.  W. N. BOOTH  1,766,100
WIRE WHEEL
Filed June 25, 1928   2 Sheets-Sheet 2
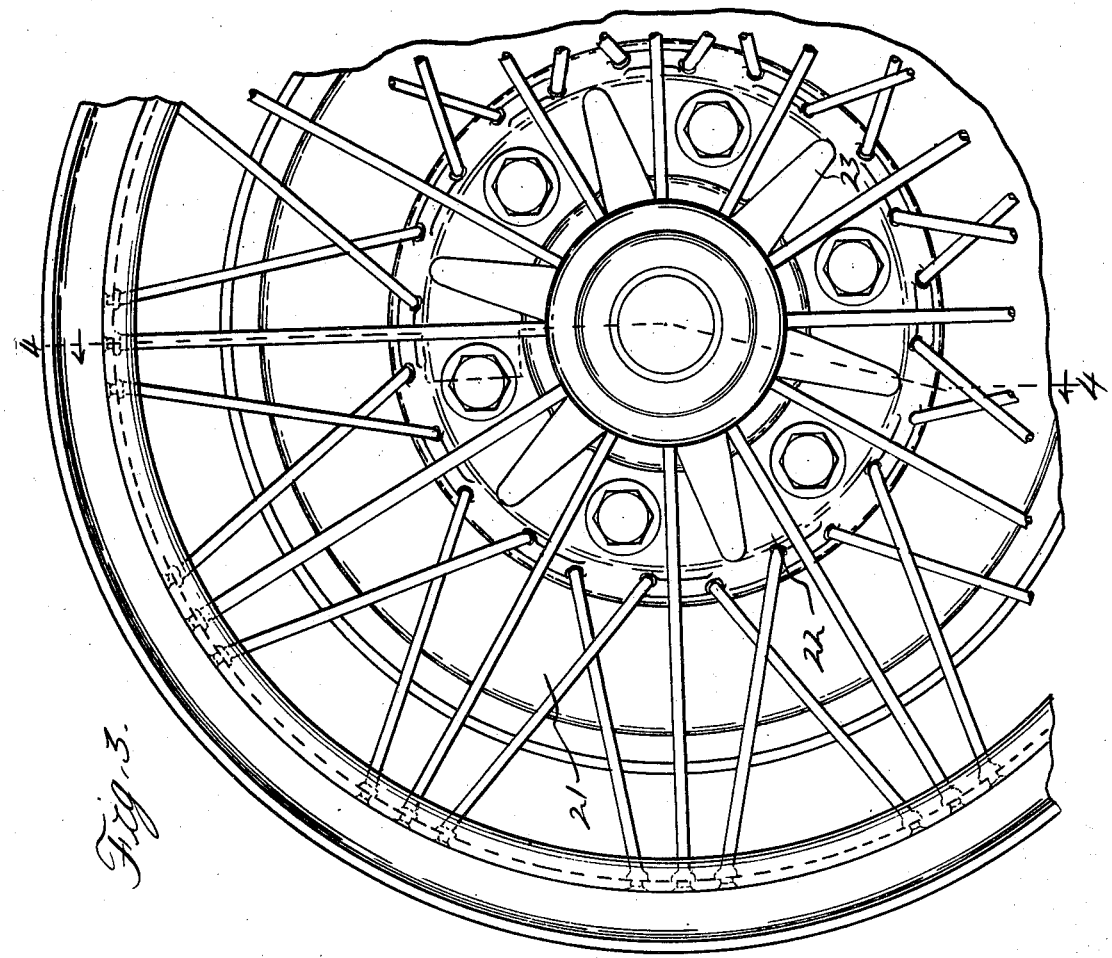
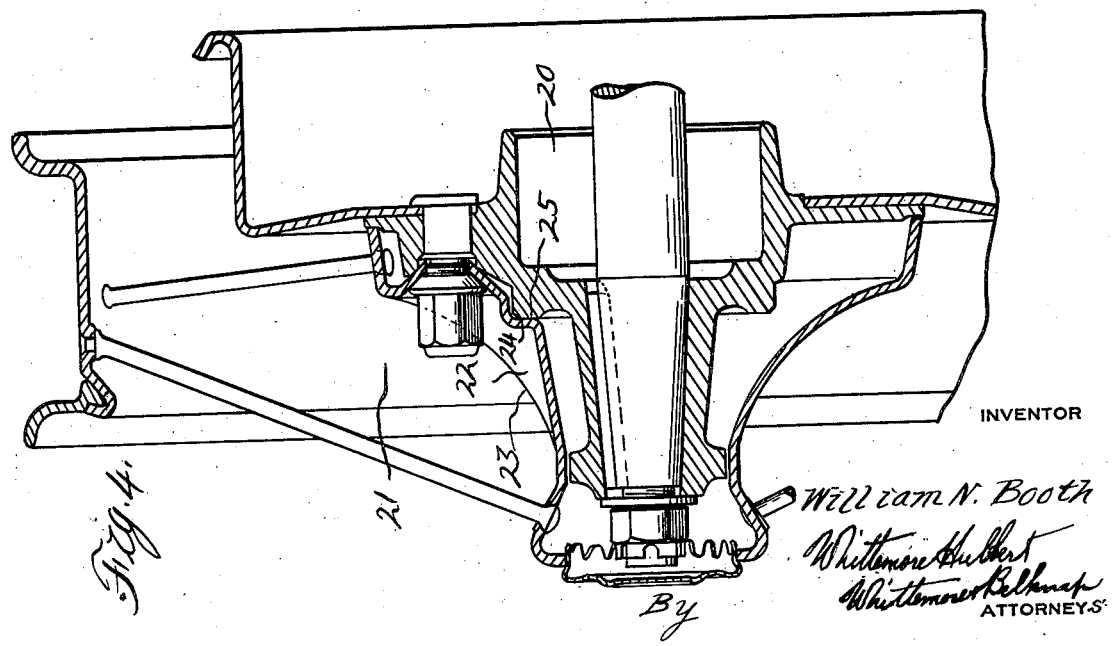
INVENTOR
William N. Booth
ATTORNEYS Patented June 24, 1930

1,766,100

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

WIRE WHEEL

Application filed June 25, 1928. Serial No. 288,195.

The invention relates to wire wheels and refers more particularly to wire wheels designed for use with motor vehicles. One of the objects of the invention is to secure a firm mounting for the wheel body upon the wheel hub. Another object is to effect tensioning or increased tensioning of the spokes while securing the wheel body to the wheel hub. With these as well as other objects in view, the invention resides in the novel features of construction and combinations and arrangements of parts as more fully hereinafter set forth.

In the drawings:—

Figure 1 is a front elevation of a portion of a vehicle wire wheel, embodying my invention;

Figure 2 is a cross section on the line 2—2 of Figure 1;

Figure 3 is a view similar to Figure 1, showing a modification;

Figure 4 is a cross section on the line 4—4 of Figure 3.

The wire wheel embodying my invention is designed for use with motor vehicles and, as shown in Figure 1, 1 is the wheel hub and 2 the wire wheel body, which is detachably mounted upon the wheel hub. The wheel hub has the barrel 3 and the fixed radial flange 4 and carries the brake drum 5, the web of which is fixedly secured to the rear side of the fixed flange. The wire wheel body comprises the flexible hub shell 6, the rim member 7 and the sets of front and rear spokes 8 and 9, respectively. The hub shell 6 is formed of sheet metal and has the barrel and flange portions 10 and 11, respectively, to the front and rear ends of which are respectively secured the inner ends of the sets of spokes 8 and 9.

To detachably secure the wire wheel body to the wheel hub I have provided the annular series of bolts 12 and nuts 13, the former extending through the web of the brake drum, the fixed flange 4 and the flange portion 11. The front side of the fixed flange 4 has the tapered recesses 14, which encircle the bolts 12 and the flange portion 11 has corresponding tapered tubular driving projections 15 for engaging the recesses, the nuts 13 having the tapered ends 16 engaging the driving projections and clamping the same against the walls of the recesses. These projections and recesses in addition to driving the wheel body with the wheel hub transmit the radial load upon the wheel hub to the wheel body. To resiliently lock the nuts upon the bolts, I have so formed the hub shell that it is flexed by the nuts 13 while securing the hub shell to the wheel hub. This hub shell has the longitudinally extending reinforcing ribs 17 which are formed in the barrel and flange portions and this hub shell also has located therein and between the ribs 17 the tubular driving projections 15. In addition, this hub shell has the depressed shoulders 18 which are struck out and are adapted to engage the annular shoulder 19 formed upon the fixed flange 4 radially inward of the bolts 12, but radially outward of the barrel 3.

The arrangement is such that the shoulders 18 and 19 cooperate to limit the axial movement of the wire wheel body upon the wheel hub prior to engagement of the tubular driving projections 15 in their recesses 14. As a consequence, when the nuts 13 are being tightened down upon their respective bolts the flange portion 11 of the hub shell is flexed and this flexing, in addition to assisting in locking the nuts upon the bolts, effects tensioning or increased tensioning of the spokes by axially separating the anchoring portions upon the hub shell for the inner ends of these spokes.

In the modifications shown in Figures 3 and 4, the wheel hub 20 and the wire wheel body 21 are of the same general construction as the wheel hub 1 and the wire wheel body 2. The hub shell 22 of the wheel body instead of having struck-out shoulders, has formed between its longitudinally extending reinforcing ribs 23 the depressed shoulders 24 for engaging the annular shoulders 25 upon the fixed flange of the wheel hub. This construction functions in the same manner as that shown in Figures 1 and 2.

What I claim as my invention is:

1. In a wire wheel, the combination with a hub member having a flange, of a wire wheel body having a rim member, a flexible hub shell and spokes extending between said rim member and hub shell, said hub shell being depressed at angularly spaced points intermediate its points of connections with said spokes to bear upon said flange and limit axial movement of said wire wheel body upon said hub member, and means for securing said wire wheel body to said hub member, said means engaging said hub shell and flexing the same after it bears upon said flange.

2. In a wire wheel, the combination with a hub member having a flange, of a wire wheel body having a rim member, a flexible hub shell and spokes extending between said rim member and hub shell, said hub shell having reinforcing ribs and being provided with angularly spaced shoulders for bearing upon said flange to limit the axial movement of said wire wheel body upon said hub member, and means for securing said wire wheel body to said hub member, said means holding said shoulders against said flange and flexing said hub shell.

3. In a wire wheel, the combination with a hub member having a flange, of a wire wheel body having a rim member, a sheet metal hub shell and spokes extending between said rim member and hub shell, said hub shell having reinforcing ribs and being provided with struck-out shoulders intermediate the points of connections of said hub shell with said spokes, said shoulders being adapted to bear upon said flange and limit axial movement of said wire wheel body upon said hub member, and means radially outward beyond said shoulders for securing said wire wheel body to said hub member, said means flexing said hub shell.

In testimony whereof I affix my signature.

WILLIAM N. BOOTH.